United States Patent
Kwon et al.

(10) Patent No.: US 9,048,510 B2
(45) Date of Patent: Jun. 2, 2015

(54) ELECTRODE ASSEMBLY, BATTERY CELL, MANUFACTURING METHOD OF ELECTRODE ASSEMBLY, AND MANUFACTURING METHOD OF BATTERY CELL

(71) Applicant: LG Chem, Ltd., Seoul (KR)

(72) Inventors: Sung-Jin Kwon, Daejeon (KR); Soon-Ho Ahn, Daejeon (KR); Dong-Myung Kim, Daejeon (KR); Ki-Woong Kim, Daejeon (KR); Young-Hoon Kim, Daejeon (KR); Sung-Han Yoon, Daejeon (KR); Seung-Min Ryu, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 14/132,132

(22) Filed: Dec. 18, 2013

(65) Prior Publication Data

US 2014/0106206 A1   Apr. 17, 2014

Related U.S. Application Data

(63) Continuation of application No. PCT/KR2013/004675, filed on May 28, 2013.

(30) Foreign Application Priority Data

May 29, 2012 (KR) .................. 10-2012-0056918
Nov. 9, 2012 (KR) .................. 10-2012-0127000
May 28, 2013 (KR) .................. 10-2013-0060505

(51) Int. Cl.
   *H01M 10/0585* (2010.01)
   *H01M 10/0525* (2010.01)
   *H01M 2/18* (2006.01)

(52) U.S. Cl.
   CPC ...... *H01M 10/0585* (2013.01); *H01M 10/0525* (2013.01); *Y10T 156/1052* (2015.01); *Y10T 29/49112* (2015.01); *H01M 2/18* (2013.01); *Y02E 60/122* (2013.01)

(58) Field of Classification Search
   None
   See application file for complete search history.

(56) References Cited

U.S. PATENT DOCUMENTS

2002/0124949 A1\* 9/2002 Fukuda et al. ............... 156/251
2002/0160257 A1\* 10/2002 Lee et al. .................... 429/130

(Continued)

FOREIGN PATENT DOCUMENTS

JP   2003-017112 A   1/2003
JP   2003-523059 A   7/2003

(Continued)

OTHER PUBLICATIONS

International Search Report for PCT/KR2013/004675, mailed Sep. 27, 2013.

(Continued)

*Primary Examiner* — Patrick Ryan
*Assistant Examiner* — Haixia Zhang
(74) *Attorney, Agent, or Firm* — Lerner, David, Littenberg, Krumholz & Mentlik, LLP (57) ABSTRACT

The present invention relates to a method of manufacturing an electrode assembly, the method including: preparing an electrode laminate including at least one negative electrode, at least one positive electrode, and at least one separation film; generating a separation film assembly by bonding remaining portions of the separation film positioned in regions not corresponding to shapes of the negative electrode and the positive electrode; and cutting the separation film assembly so as to correspond to the shapes of the negative electrode and the positive electrode, and an electrode assembly manufactured by the method.

8 Claims, 5 Drawing Sheets

(56) References Cited

U.S. PATENT DOCUMENTS

| | | | |
|---|---|---|---|
| 2006/0081328 A1 | 4/2006 | Parker et al. | |
| 2010/0015511 A1 | 1/2010 | Yoo et al. | |
| 2011/0146064 A1 | 6/2011 | Feaver et al. | |
| 2011/0151307 A1* | 6/2011 | Hwang et al. | 429/129 |
| 2012/0276435 A1* | 11/2012 | Hallmark | 429/131 |
| 2012/0321932 A1 | 12/2012 | Ise et al. | |
| 2013/0189569 A1* | 7/2013 | Youm, Chul | 429/185 |

FOREIGN PATENT DOCUMENTS

| | | |
|---|---|---|
| JP | 2011-009118 A | 1/2011 |
| JP | 2011-165481 A | 8/2011 |
| KR | 10-2004-0022713 A | 3/2004 |
| KR | 10-0420147 B1 | 3/2004 |
| KR | 10-0567583 B1 | 4/2006 |
| KR | 10-2007-0099068 A | 10/2007 |
| KR | 10-2007-0116295 A | 12/2007 |
| KR | 10-2008-0087192 A | 10/2008 |
| WO | 2006/095579 A1 | 9/2006 |

OTHER PUBLICATIONS

European search report for PCT/KR2013/004675, dated Dec. 9, 2014.

* cited by examiner

ELECTRODE ASSEMBLY, BATTERY CELL, MANUFACTURING METHOD OF ELECTRODE ASSEMBLY, AND MANUFACTURING METHOD OF BATTERY CELL

CROSS-REFERENCE TO RELATED APPLICATIONS

This application is a Continuation Bypass Application of International Patent Application No. PCT/KR2013/004675, filed May 28, 2013, which claims the priorities of Korean Patent Application Nos. 10-2012-0056918, filed on May 29, 2012, 10-2012-0127000, filed on Nov. 9, 2012, and 10-2013-0060505, filed on May 28, 2013, in the Korean Intellectual Property Office, the disclosures of which are incorporated herein by reference.

BACKGROUND

1. Field of the Invention

The present invention relates to an electrode assembly and an battery cell, and methods of manufacturing the same, and more particularly, to an electrode assembly and a battery cell having various shapes, and methods of manufacturing the same.

2. Description of the Related Art

With technical advancements and increasing demand for mobile devices, demand for rechargeable batteries has sharply increased. Among rechargeable batteries, lithium secondary batteries with high degrees of energy density and high operating voltages, as well as superior life cycles are widely used as energy sources for various electronic appliances as well as a variety of mobile devices.

Generally, a lithium secondary battery is formed to have a structure in which an electrode assembly and an electrolyte are sealed within a battery case, and may be classified as a cylindrical-type battery, a prismatic-type battery, a pouch-type battery, or the like according to the appearance thereof, or may be classified as a lithium ion battery, a lithium ion polymer battery, a lithium polymer battery, or the like, according to the type of electrolyte used therein. Due to the recent trend for the miniaturization of mobile devices, the demand for thin prismatic batteries and pouch-type batteries has increased, and particularly, interest in lightweight pouch-type batteries having shapes that are easy to change is high.

The electrode assembly received in the battery case may be classified as a jelly-roll (wound)-type, a stacked (laminated)-type, and a stacked and folded (composite)-type according to the shape thereof. The jelly-roll-type electrode assembly is manufactured by coating metal foil used as a current collector with an electrode active material, pressing the coated metal foil, cutting the pressed metal foil in a band form having a desired length and width, separating a negative electrode sheet and a positive electrode sheet using a separator film, and winding the negative and positive electrode sheets and the separator film in a spiral form. In the jelly-roll-type electrode assembly, since an excessive amount of stress may be generated from a curved electrode surface due to a small radius of gyration in a central portion of the spiral form, electrode delamination may be easily generated. Such electrode delamination may facilitate an extraction of lithium metal crystals from an electrode during charging and discharging of the electrode to cause a reduction in battery lifespan, thereby degrading battery stability.

Meanwhile, the stacked-type electrode assembly is an electrode assembly, manufactured in a manner in which a negative electrode, a separator, and a positive electrode are vertically stacked. The stacked and folded-type electrode assembly is an electrode assembly, manufactured by winding or folding a single electrode or stacked electrode bodies respectively formed of a negative electrode, a separator, and a positive electrode using a long sheet-type separator.

Recently, in accordance with increasing demand for mobile devices having various designs, battery cells having various shapes are also required, such that the development of battery cells having various shapes, rather than the related art quadrangular shapes, for example, a battery cell having a curved portion, are being attempted. However, in order to mass produce such various battery cells, several technical limitations need to be solved. One aspect of the limitations relates to the processing of a separator interposed between electrodes or a sheet-type separation film enclosing a unit cell. In general, since a negative electrode or a positive electrode may be manufactured by coating a current collector formed of a solid material such as a metal, with an electrode active material, the electrode may be easily cut to have a desired shape using a mold or the like. However, since the separator or the separation film may have a reduced thickness in a range of about 10 to 30 μm and be formed of a soft material such as a polyester, when the film is cut using a mold or the like, it is difficult to precisely cut the film in a desired shape, abrasion of the mold is rapidly generated, a lowering in productivity is caused, and manufacturing costs are increased. Meanwhile, in a case in which shapes of the electrode and the separator and/or the separation film do not coincide with each other and thus, the separator and/or the separation film is present on a portion on which the electrode is not present, when the electrode assembly is inserted in an battery case, a separate space for receiving the separator and/or the separation film is required to cause obstruction in implementing a desired battery design.

Thus, in order to realize battery cells having various shapes, the development of technology enabling the processing of the separator and/or the separation film so as to coincide with the shape of the electrode assembly has been demanded.

SUMMARY OF THE INVENTION

Aspects of the present invention provide methods of manufacturing an electrode assembly and a battery cell having various shapes by processing a separator and/or a separation film so as to coincide with shapes of electrodes.

According to an aspect of the present invention, there is provided a method of manufacturing an electrode assembly, the method including: preparing an electrode laminate including at least one negative electrode, at least one positive electrode, and at least one separation film; generating a separation film assembly by bonding remaining portions of the separation film positioned in regions not corresponding to shapes of the negative electrode and the positive electrode; and cutting the separation film assembly so as to correspond to the shapes of the negative electrode and the positive electrode.

The generating of the separation film assembly may be performed by fusing the remaining portions of the separation film and the fusing may be performed at a temperature of (Tg−20)° C. to (Tg+20)° C., where a glass transition temperature of the separation film is defined as Tg.

The cutting of the separation film assembly may be performed using a cutting blade, a die, scissors, or a laser beam.

The electrode laminate may include the at least one negative electrode, the at least one positive electrode, and a plurality of first separation films interposed between the negative electrode and the positive electrode, and the first separation films may have shapes different from those of the negative electrode and the positive electrode.

According to another example of the present invention, the electrode laminate may include a plurality of unit cells respectively including the at least one negative electrode, the at least one positive electrode, and at least one first separation film interposed between the negative electrode and the positive electrode; and at least one second separation film disposed on an interface between the unit cells, and at least one of the first separation film and the second separation film may have a shape different from those of the negative electrode and the positive electrode.

According to another example of the present invention, the electrode laminate may include a plurality of unit cells respectively including the at least one negative electrode, the at least one positive electrode, and at least one first separation film interposed between the negative electrode and the positive electrode; and a long sheet-type third separation film covering the unit cells, and at least one of the first separation film and the third separation film may have a shape different from those of the negative electrode and the positive electrode.

According to another example of the present invention, the electrode laminate may include the at least one negative electrode, the at least one positive electrode, and a long sheet-type fourth separation film covering the negative electrode and the positive electrode.

According to another aspect of the present invention, there is provided a method of manufacturing a battery cell, the method including: packing the electrode assembly manufactured by the method described above, using a battery case. The method of manufacturing a battery cell according to the present invention may further include processing the battery case to have a shape corresponding to that of the electrode assembly, if necessary.

According to another aspect of the present invention, there is provided an electrode assembly manufactured by the method described above and including the at least one negative electrode, the at least one positive electrode, and the at least one separation film, wherein the at least one separation film may include a cut portion cut so as to correspond to shapes of the negative and positive electrodes, and the cut portion may have a lower degree of porosity than that of a portion of the separation film, interposed between the positive electrode and the negative electrode.

The cut portion may have a degree of porosity decreased by about 20% to 50%, compared to the portion of the separation film interposed between the positive electrode and the negative electrode.

Meanwhile, according to the present invention, in the negative electrode and the positive electrode, at least one corner portion or at least one surface thereof may be curved. In the negative electrode and the positive electrode, at least one corner portion thereof may be curved.

According to another aspect of the present invention, there is provided a battery cell having the electrode assembly described above, mounted within a battery case. The battery case may have a shape corresponding to that of the electrode assembly. The battery cell may be a lithium ion secondary battery or a lithium ion polymer secondary battery.

According to another aspect of the present invention, there is provided a device comprising at least one battery cell according to the present invention. The device may be a mobile phone, a portable computer, a smartphone, a smartpad, a netbook, a light electronic vehicle (LEV), an electric vehicle, a hybrid electric vehicle, a plug-in hybrid electric vehicle, or a power storage device.

In the method of manufacturing an electrode assembly according to embodiments of the present invention, a relatively hard separation film assembly is generated by bonding the remaining portions of separation films, present in regions not corresponding to shapes of electrodes, such that the separation films can be cut to have a desired shape.

In addition, with the method according to embodiments of the present invention, a plurality of separation films inserted in an electrode assembly can be all cut through a single process, such that a significantly simplified process can be obtained and a battery cell can be variously formed.

DETAILED DESCRIPTION

Hereinafter, the present invention will be described in more detail. The drawings are provided for the purpose of illustrating the present invention and merely depict embodiments of the present invention, but are not intended to limit the scope of the invention. In the drawings, like reference numerals refer to like elements throughout, and the dimensions of elements may be exaggerated, scaled down, or omitted for clarity of illustration.

First, a method of manufacturing an electrode assembly according to an embodiment of the present invention will be described.

The method of manufacturing an electrode assembly according to the embodiment of the present invention may include: preparing an electrode laminate including at least one negative electrode, at least one positive electrode, and at least one separation film; generating a separation film assembly by bonding the remaining portions of the separation film positioned in regions not corresponding to shapes of the negative electrode and the positive electrode; and cutting the separation film assembly so as to correspond to the shapes of the negative electrode and the positive electrode The preparing of the electrode laminate may be performed by stacking single electrodes or unit cells with the separator film interposed therebetween.

In embodiments of the present invention, the term "electrode laminate" is not particularly limited, as long as it has a structure including at least one negative electrode, at least one separation film, and at least one positive electrode. That is, in embodiments of the present invention, the electrode laminate may have a form in which negative and positive electrodes, single electrodes, are alternately stacked with a separation film interposed therebetween, or a plurality of unit cells are stacked with a separation film interposed therebetween (that is, a stacked-type electrode laminate), or may have a structure in which single electrodes or unit cells are covered by a long sheet-type separation film (that is, a stacked and folded-type electrode laminate).

In this case, the term 'unit cell' refers to a single unit battery structure including a positive electrode, a negative electrode, and a separator interposed between the positive electrode and the negative electrode, and may include at least one positive electrode, at least one negative electrode, and at least one separation film. The number, arrangements and the like, of a positive electrode, a negative electrode, and a separator configuring a single unit cell are not particularly limited. For example, the unit cells may include a unit cell in which electrodes disposed at outermost portions thereof have the same polarity, such as a unit cell of a positive electrode/a separation film/a negative electrode/a separation film/a positive electrode, or a unit cell of a negative electrode/a separation film/a positive electrode/a separation film/a negative electrode, or a unit cell in which electrodes disposed at outermost portions thereof have opposing polarities, such as a unit cell of a positive electrode/a separation film/a negative electrode, or a unit cell of a positive electrode/a separation film/a negative electrode/a separation film/a positive electrode/a separation film/a negative electrode.

Meanwhile, in embodiments of the present invention, the stacked-type electrode laminate has a concept including an electrode laminate, manufactured by a method (hereinafter, referred to as a "lamination and stacking method") of preparing basic unit bodies each having a sequential stack structure such as a negative electrode/a separator/a positive electrode/a separator or a positive electrode/a separator/a negative electrode/a separator and then stacking these basic unit bodies with a separator interposed therebetween, as well as an electrode laminate, manufactured by a typical method of sequentially stacking a positive electrode, a separator, and a negative electrode. In this case, the basic unit bodies may include at least two positive electrodes and at least two negative electrodes, and one of the outermost surfaces of the basic unit body is configured of a separator and the other thereof is formed of an electrode.

Meanwhile, in the case of the electrode laminate manufactured by the lamination and stacking method, it is not necessarily required that the electrode laminate is only formed of the above-described basic unit bodies, and other constitutional electrode structures and/or separators may be mixed with the basic unit bodies to be used. For example, the electrode laminate manufactured by the lamination and stacking method may be configured in such a manner that it has an electrode structure formed of a separator/a positive electrode/a separator or a separator/a negative electrode/a separator, or a separator on a top layer portion or a bottom layer portion thereof and has the above-described basic unit bodies on the remaining portions thereof. In the case of the electrode laminate manufactured by the lamination and stacking method, the sum of the numbers of positive and negative electrodes included in the overall electrode laminate may be the same as the number of separators, and alternatively, the number of separators may be configured to be greater than that of the sum of the positive and negative electrodes by an amount corresponding to one, by adding an separator or the like on an outermost portion of the electrode laminate.

Meanwhile, in embodiments of the present invention, the term "stacking and folding" is a common name of methods in which a single electrode and/or electrode laminates including at least one positive electrode, at least one separator, and at least one negative electrode stacked therein are disposed on a long sheet-type separation film and then the long sheet-type separation film is folded, the folding method is not particularly limited, and it should be understood that the term "stacking and folding" is a concept embracing all folding methods commonly known in the art, such as a method (called Z-folding or folding screen type) in which a sheet-type separation film is folded in a zigzag form, a method in which electrode laminates having at least one negative electrode and at least one positive electrode stacked with a separator interposed therebetween are disposed on one surface of a sheet-type separation film and then, the sheet-type separation film is rolled and wound, a method in which single electrodes are alternately disposed on both surfaces of a sheet-type separation film and the sheet-type separation film is rolled and wound, and the like.

In addition, in embodiments of the present invention, the term 'separation film' is used as having a concept embracing a leaf-type separation film cut to have a predetermined size and a long sheet-type separation film.

Meanwhile, according to a first embodiment of the present invention, the electrode laminate may be formed of at least one negative electrode, at least one positive electrode, and at least one first separation film interposed between the negative electrode and the positive electrode. Meanwhile, in the first embodiment of the present invention, the first separation film may be a leaf-type separation film, but is not limited thereto.

Further, according to a second embodiment of the present invention, the electrode laminate may be configured to have a structure including a plurality of unit cells respectively including at least one negative electrode, at least one positive electrode, and at least one first separation film interposed between the negative electrode and the positive electrode, and at least one second separation film disposed on an interface between the unit cells.

According to a third embodiment of the present invention, the electrode laminate may be configured to have a structure including a plurality of unit cells respectively including at least one negative electrode, at least one positive electrode, and at least one first separation film interposed between the negative electrode and the positive electrode, and a long sheet-type third separation film covering the unit cells. Meanwhile, in the third embodiment of the present invention, the first separation film may be a leaf-type separation film, but is not limited thereto.

In addition, according to a fourth embodiment of the present invention, the electrode laminate may include at least one negative electrode, at least one positive electrode and a long sheet-type fourth separation film covering the negative electrode and the positive electrode.

Meanwhile, in a structure in which single electrodes or unit cells are covered by a long sheet-type separation film in a similar manner to those of the third embodiment and the fourth embodiment, methods of covering single electrodes or unit cells by a sheet-type separation film are not particularly limited, and various folding methods may embrace all folding methods commonly known in the art using a sheet-type separation film, such as a method (called Z-folding or folding screen type) in which a sheet-type separation film is folded in a zigzag form, a method in which electrode laminates having at least one negative electrode and at least one positive electrode stacked with a separator interposed therebetween are disposed on one surface of a sheet-type separation film and then, the sheet-type separation film is rolled and wound, a method in which single electrodes are alternately disposed on both surfaces of a sheet-type separation film and the sheet-type separation film is rolled and wound, and the like.

Meanwhile, materials for the positive electrode, the negative electrode and the separation film included in the electrode assembly of the present invention are not particularly limited, and materials for the positive electrode, the negative electrode and the separation film known in the art may be used without any limitation. For example, the negative electrode may be formed by coating a negative electrode current collector formed of copper, nickel, aluminum or an alloy thereof containing at least one of the above-mentioned elements, with a negative electrode active material, such as a lithium metal, a lithium alloy, carbon, petroleum coke, activated carbon, graphite, a silicon compound, a tin compound, a titanium compound or an alloy thereof containing at least one of the above-mentioned elements. Also, the positive electrode may be formed by coating a positive electrode current collector formed of aluminum, nickel, copper or an alloy containing at least one of the above-mentioned elements, with a positive electrode active material, such as lithium manganese oxide, lithium cobalt oxide, lithium nickel oxide, lithium iron phosphate, or a compound or mixture containing at least one of the above-described elements. In this regard, the coated areas of the electrode active materials in the positive electrode and the negative electrode constituting one unit cell may be the same or different. Also, the electrode active materials may be coated on both surfaces of the current collector, or may be coated on one surface of the current collector for the formation of non-coated portions.

Meanwhile, the separation film may be, for example, a multilayer film having a fine porous structure and formed of polyethylene, polypropylene, or a combination thereof, or may be a polymer film for solid polymer electrolyte or gel type polymer electrolyte, such as polyvinylidene fluoride, polyethylene oxide, polyacrylonitrile or polyvinyliden fluoride hexafluoropropylene copolymer.

Figure 1:
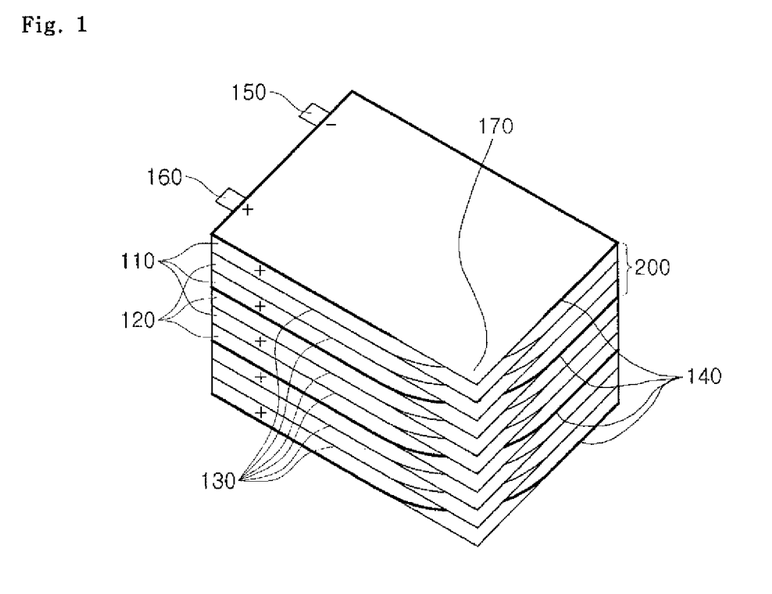
FIG. 1 is a view illustrating a process of preparing an electrode laminate according to an embodiment of the present invention.
Figure 3:
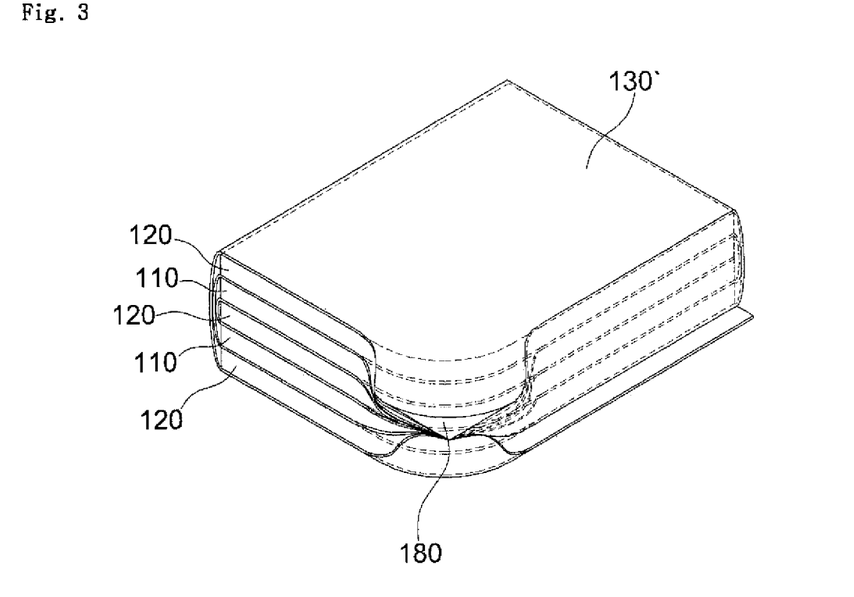

FIG. 1 illustrates an embodiment for explaining a process of preparing the electrode laminate. As illustrated in FIG. 1, the electrode laminate may include at least one negative electrode 120, at least one positive electrode 110, and at least one separation film 130 or 140. FIG. 1 illustrates an electrode laminate in which three unit cells 200 respectively having the positive electrode 110 and the negative electrode 120 stacked with the separation film 130 interposed therebetween are stacked on one another with the separation films 140 interposed therebetween, but is merely provided as an example of the electrode laminate according to the embodiment of the present invention, and the present invention is not limited thereto. For example, as illustrated in FIG. 3, the electrode laminate according to the embodiment of the present invention may be understood as having a concept including all electrode laminates having various shapes, such as an electrode laminate having the positive electrode 110 and the negative electrode 120 stacked while being covered by a long sheet-type separation film 130', an electrode laminate (not shown) in which unit cells including leaf-type separation films are stacked while being covered by a long sheet-type separation film, and the like.

Meanwhile, in the formation of the electrode laminate, portions of, or the entirety of, the separation films 130 and 140 included in the electrode laminate may have shapes different from those of the positive and negative electrodes. For example, in the electrode laminate according to the embodiment of the present invention, single electrodes and/or unit cells having various shapes, rather than having rectangular shapes generally used in the art, for example, single electrodes and/or unit cells formed in such a manner that at least one corner portion and/or at least one surface thereof is curved, may be used, and a quadrangular separation film now on the market may be used as the separation film interposed between the single electrodes and/or the unit cells. For example, as illustrated in FIG. 1, the negative electrode 120 and the positive electrode 110 may be formed such that single corner portions thereof are curved, and the separation films 130 and 140 may have rectangular shapes. In this case, since the electrodes and the separation films have different shapes from each other, regions 170 of the separation films 130 and 140 that are not covered by the electrodes and exposed to the outside may be generated, in the curved corner portions of the electrodes. Such regions will be known as 'regions not corresponding to shapes of the negative electrode and the positive electrode' for convenience. Although not illustrated in the drawings, even in the case of using a long sheet-shape separation film in the electrode assembly according to the present invention, in a similar manner as that of the third embodiment or the fourth embodiment, the remaining portions of the separation film may be present in portions in which electrodes are not present, that is, in regions in which a shape of the separation film does not correspond to those of single electrodes and/or unit cells. In this manner, in a case in which the remaining regions 170 of the separation film are present in the regions not corresponding to shapes of the negative electrode and the positive electrode, when the electrode assembly is inserted in a battery case, a separate space for receiving the remaining regions of the separation film is required and it is also undesirable in terms of a battery design.

Meanwhile, FIG. 1 discloses an electrode laminate in which single corner portions of the negative and positive electrodes are curved. However, the present invention is not limited thereto, and electrodes having variously modified shapes according to a shape of a desirable electrode assembly may be used. In addition, according to the shapes of the negative and positive electrodes, shapes and the number of the remaining regions of the separation films may be varied. It may be understood that these modified examples are all included within the scope of the present invention.

Meanwhile, FIG. 1 illustrates the case in which all separation films included in the electrode laminate have shapes different from those of the electrodes, but the present invention is not limited thereto. That is, in an embodiment of the present invention, a portion of the separation films included in the electrode laminate may have the same shape as those of the electrodes, and the remainder thereof may have shapes different from those of the electrodes. For example, in the case of an electrode laminate having a plurality of unit cells stacked therein, a separation film included in the unit cells may be processed to have the same shape as those of electrodes during a manufacturing process of the unit cells. In this case, only a separation film inserted onto an interface surface between the unit cells or a sheet-type separation film covering the unit cells has a shape different from those of the electrodes.

Figure 2:
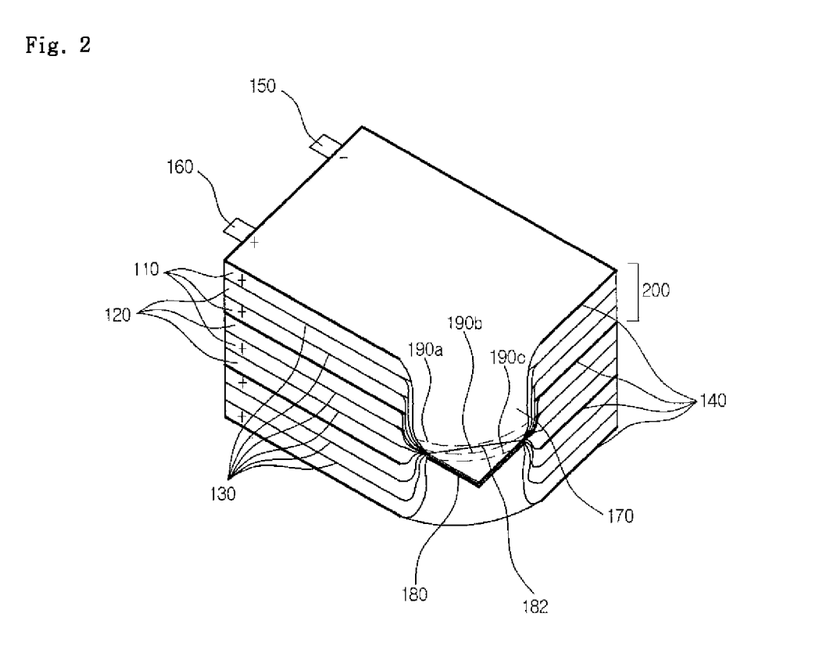
FIGS. 2 and 3 are views illustrating a process of generating an assembly of separation films (hereinafter, referred to as a 'separation film assembly') according to an embodiment of the present invention.

Next, the generating of the separation film assembly will be described with reference to FIGS. 2 and 3. FIG. 2 is a view illustrating a state in which a separation film assembly is formed in an electrode laminate using a plurality of leaf-type separation films, and FIG. 3 is a view illustrating a state in which a separation film assembly is formed in an electrode laminate using a single sheet-type separation film. As illustrated in FIGS. 2 and 3, a separation film assembly 180 may be generated by bonding the remaining regions 170 and 170' of the separation films protruded outwardly of the negative and positive electrodes. In this case, the bonding is not limited, but may be performed by a method of fusing the remaining portions of the separation films with a temperature and/or pressure being applied thereto, and the like. Meanwhile, a bonding temperature of the separation films is not limited, but in consideration of bonding properties of the separation films, may be within a range of (Tg−20)° C. to (Tg+20)° C., where a glass transition temperature of the separation films is defined as Tg.

Meanwhile, in order to facilitate a cutting operation, the separation film assembly 180 may include a bonding portion having a thickness of approximately 30 μm to 700 μm, preferably, approximately 50 μm to 700 μm, more preferably, approximately 100 μm to 700 μm.

After forming the separation film assembly through the process described above, the separation film assembly is cut so as to correspond to the shapes of the negative and positive electrodes. As described above, a single sheet of separation film may be significantly thin and vulnerable to weakness, such that the cutting thereof may not be facilitated. However, when several sheets of separation film are bonded to one another as in the embodiment of the present invention, they may have a relative degree of hardness, such that the cutting thereof may be facilitated. This is because the separation film is formed of a poly material and thus, bonding is performed as the material is softened under conditions of a predetermined degree of temperature and pressure. In addition, since the separation films have a single bonding portion and the single bonding portion is cut, the entirety of the separation films may be cut in a similar manner to each other by a single cutting operation. In this case, the cutting is not limited, but may be performed by an element such as a cutting blade, a die, scissors, or a laser beam.

Meanwhile, the cutting may be performed in such a manner that outlines and sizes of the separation films are similar to those of the positive and negative electrodes, and it is not necessarily required that the outlines and sizes of the separation films coincide with those of the positive and negative electrodes. That is, in the embodiment of the present invention, it may be understood that the term 'corresponding shape' does not indicate a shape completely coinciding with the shapes of the positive and negative electrodes and has a concept embracing cases in which the sizes and/or outlines of the separation films are slightly different from those of the positive and negative electrodes. For example, in the embodiment of the present invention, the cutting may be performed in such a manner that a small amount of the remaining separation films may be exposed outwardly of the electrodes. In addition, in consideration of a battery's stability, the cutting may be performed in such a manner that the separation film is formed to be greater than the positive and negative electrodes.

Meanwhile, a position in which the cutting is performed is not particularly limited, as long as it may be located in the vicinity of a bonding line 182 generated due to the bonding. For example, in the embodiment of the present invention, as illustrated in FIG. 2, the cutting may be performed inwardly of the bonding line 182 (190a), may be performed so as to include the bonding line 182 (190b), and may be performed outwardly of the bonding line 182 (190c). In the case in which the cutting is performed inwardly of the bonding line 182 (190a), since the separation films are separated after the cutting, the separation film assembly does not remain in the electrode assembly. Meanwhile, in the case in which the cutting is performed so as to include the bonding line 182 (190b), or is performed outwardly of the bonding line 182 (190c), the separation films may remain in the electrode assembly while being bonded to one another.

According to the manufacturing method of the present invention, since the separation films may be formed to correspond to the shapes of electrodes through a simple process, an electrode assembly having a high degree of freedom of design and excellent productivity may be manufactured.

Figure 4:
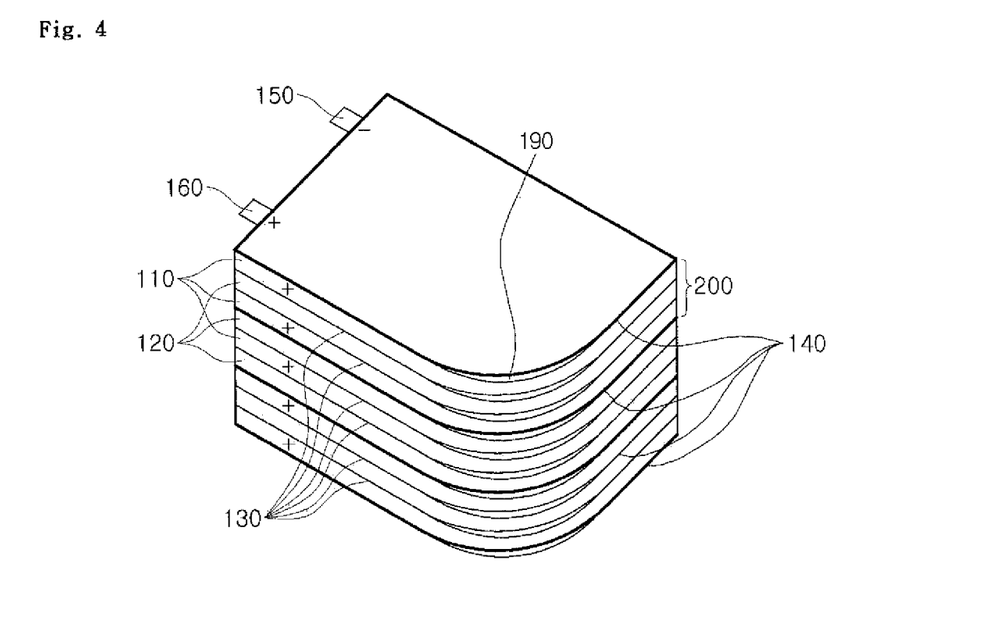
FIG. 4 is a perspective view illustrating an electrode assembly in a state in which the separation film assembly is cut, according to an embodiment of the present invention.
Figure 5:
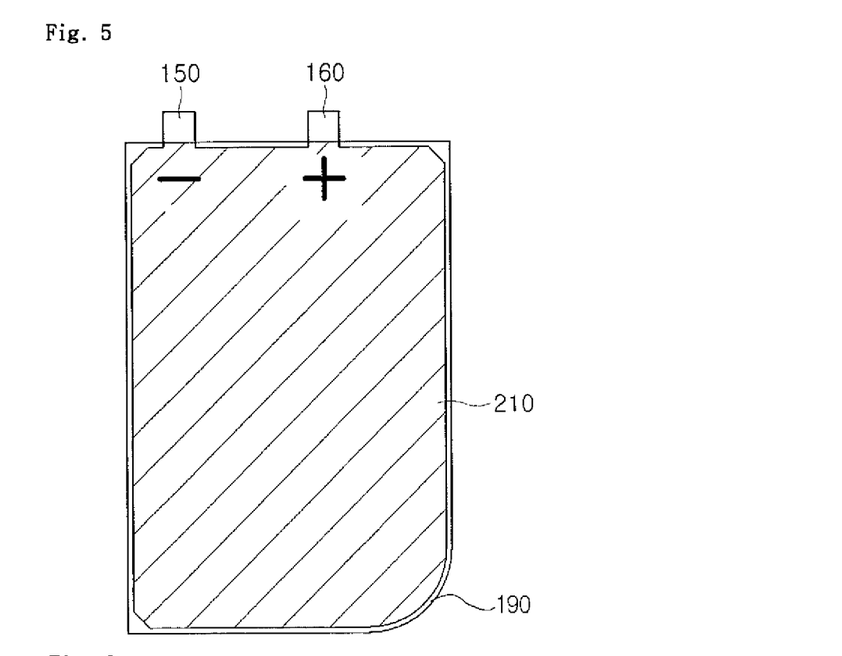
FIG. 5 is a plan view illustrating the electrode assembly of FIG. 4.

FIGS. 4 and 5 illustrate an electrode assembly according to an embodiment of the present invention, manufactured by the method described as above. FIG. 4 is a perspective view illustrating the electrode assembly according to the embodiment of the present invention. FIG. 5 is a plan view illustrating the electrode assembly of FIG. 4.

As illustrated in FIGS. 4 and 5, the electrode assembly according to the embodiment of the present invention may include the at least one negative electrode 120, the at least one positive electrode 110, and the at least one separation film 130 or 140. In this case, the separation film may include a cut portion 190 cut so as to correspond to the shapes of the negative and positive electrodes. In this case, the cut portion 190 of the separation film may have a lower degree of porosity than that of a portion of the separation film, interposed between the positive electrode 110 and the negative electrode 120. As described above, in order to facilitate the cutting of the separation film, a method of performing a cutting operation after forming the separation film assembly by applying heat and/or pressure thereto during the manufacturing of the electrode assembly may be used. However, since heat and/or pressure is applied to the separation film during the bonding of the separation film as described above, porosity in the vicinity of a bonding region of the separation film may be relatively lower than those of other portions of the separation film, having no heat and/or pressure applied thereto. Meanwhile, since the cutting may be performed in the vicinity of the bonding line 182, the out portion 190 formed due to the cutting may have a lower degree of porosity than that of the portion of the separation film, interposed between the positive electrode 110 and the negative electrode 120.

For example, the cut portion 190 may have a degree of porosity decreased by about 20% to 50%, compared to the portion of the separation film interposed between the positive electrode 110 and the negative electrode 120, but is not limited thereto. A variation ratio of porosity in the cut portion may be varied depending on a bonding method, a bonding temperature, pressure, and the type of separation film.

Meanwhile, a shape of the electrode assembly according to the embodiment of the present invention, illustrated in FIGS. 4 and 5 may be provided by way of example, and thus, the present invention is not limited thereto. For example, although FIG. 4 illustrates the case in which separation films are separated from one another after cutting, the separation films may remain in a bonded state, rather than being separated from each other, depending on the position in which the cutting is performed when the separation film assembly is cut as described above.

Furthermore, although the positive and negative electrodes having curved corner portions are illustrated in the drawings, the present invention is not limited thereto. That is, in embodiments of the present invention, the positive electrode and the negative electrode may have various shapes, rather than having rectangular shapes generally used in the art. For example, the positive electrode and the negative electrode may be formed in such a manner that at least one corner portion and/or at least one surface thereof may be curved.

Meanwhile, the electrode assembly according to the embodiment of the present invention may include electrode taps 150 and 160 for electrical connection thereof. The electrode taps are inserted in a battery case and are then coupled to electrode lead portions. The areas, arrangement positions, and the like, of the electrode taps, are not particularly limited, as long as the electrode taps having the same polarity are electrically connected to each other.

Then, a method of manufacturing a battery cell according to an embodiment of the present invention will be described. The method of manufacturing a battery cell according to the embodiment of the present invention may include packing the electrode assembly manufactured by the method described above, using a battery case.

Figure 6:
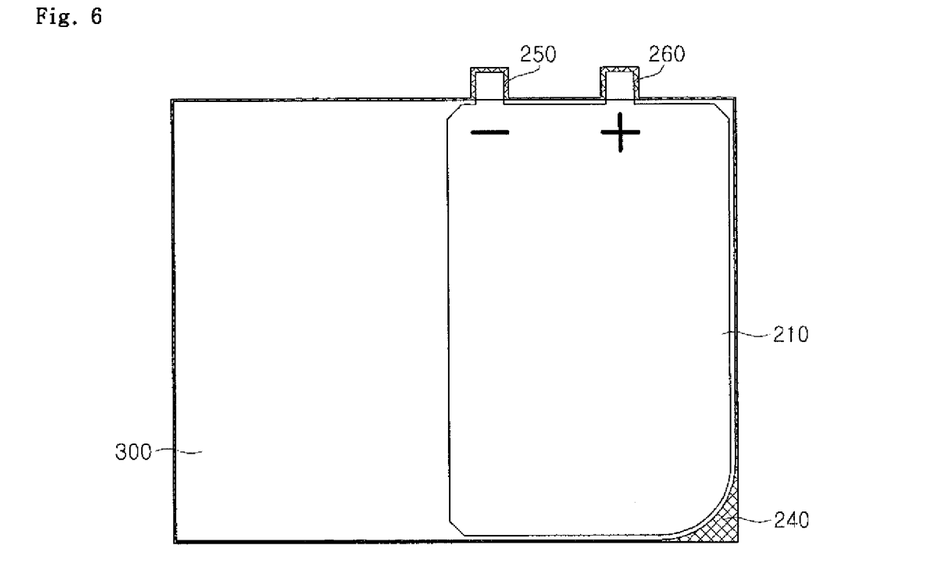
FIGS. 6 and 7 are views illustrating a method of manufacturing a battery cell according to an embodiment of the present invention.
Figure 7:
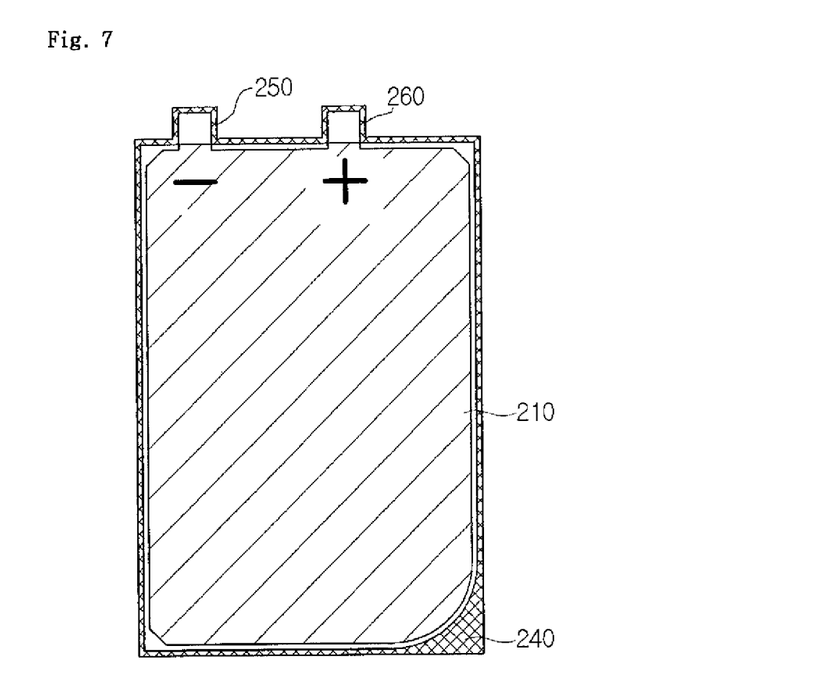

FIGS. 6 and 7 are provided to describe the method of manufacturing a battery cell. FIG. 6 is a plan view illustrating a state in which an electrode assembly 210 is placed on a battery case 300 and FIG. 7 is a plan view illustrating a state in which the battery case is folded. As illustrated in FIGS. 6 and 7, after the electrode assembly 210 manufactured by the method described above is placed on the battery case 300 having a larger area than that of the electrode assembly 210, a portion of the battery case 300, on which the electrode assembly 210 is not disposed, is folded to cover the electrode assembly 210 and then edges of the battery case are enclosed to thereby manufacture the battery cell according to the embodiment of the present invention. However, such a method is merely provided as an example of a method of packing an electrode assembly using a battery case, and the present invention is not limited thereto. Various method of packing an electrode assembly, commonly known in the art may be used without limitation.

Meanwhile, the electrode assembly 210 according to the embodiment of the present invention may be variously formed, rather than having a rectangular shape. In a case in which the electrode assembly 210 is packed using the battery case 300 having a quadrangular shape, a region of the battery case, in which the electrode assembly is not disposed, may be generated. Therefore, the method of manufacturing a battery cell according to the embodiment of the present invention may further include processing the battery case to have a shape corresponding to that of the electrode assembly.

In this case, the processing may be performed by a method such as a cutting method, a machining process, a pressing method or the like, in order to allow the battery case to have a shape corresponding to that of the electrode assembly. At this time, it is not required that the shape and size of the battery case completely correspond to the shape and size of the electrode assembly, and any shape and size thereof may be possible, as long as an internal shortage due to a phenomenon in which the electrode assembly is pushed may be prevented.

Meanwhile, the battery case is not limited, but may be a pouch type case. Battery cases having various shapes and sizes may be used if necessary. Further, the pouch type case may be formed of a laminate sheet, and the laminate sheet may be formed of an outer resin layer forming an outermost portion, a shield metal layer preventing a foreign material from penetrating therethrough, and an inner resin layer for sealing, but the present invention is not limited thereto.

Meanwhile, the battery case may include a negative electrode lead portion 250 and a positive electrode lead portion 260 electrically connecting the electrode taps of the electrode assembly and the electrode lead portions may be outwardly exposed. Although not illustrated, insulation films may be attached to upper and lower surfaces of the electrode lead portions in order to protect the electrode lead portions.

Figure 8:
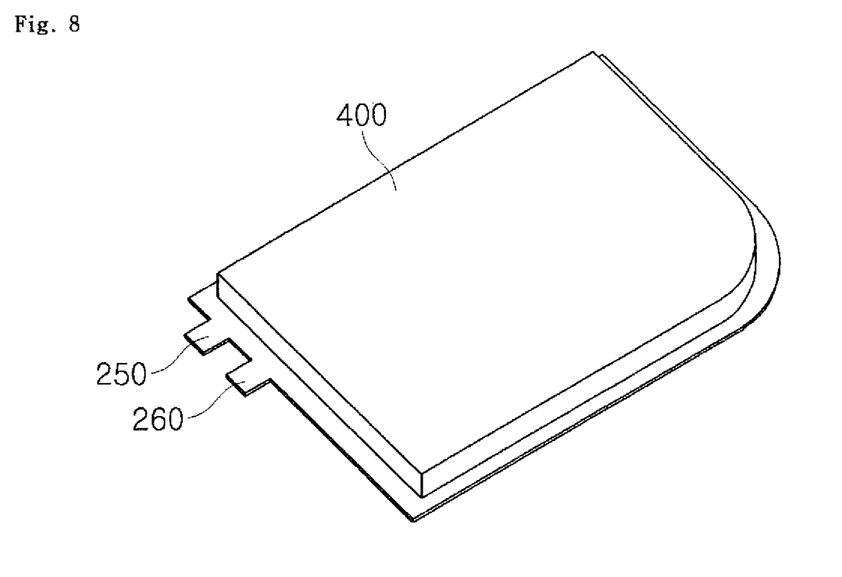
FIG. 8 is a perspective view illustrating a battery cell according to an embodiment of the present invention.
Figure 9:
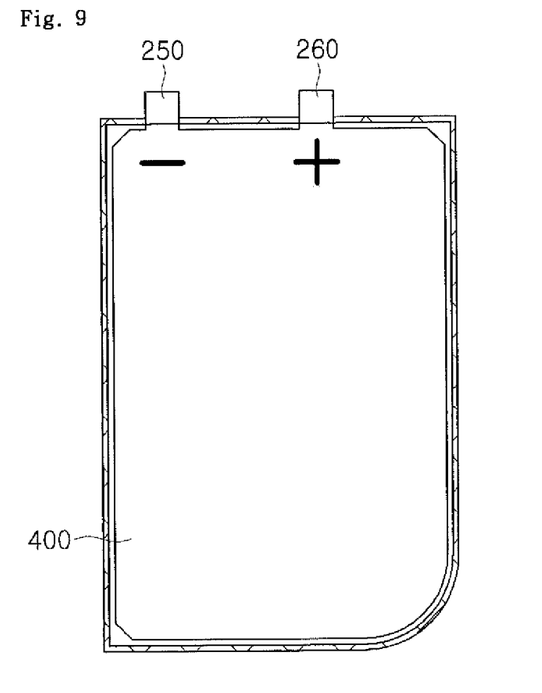
FIG. 9 is a plan view illustrating the battery cell of FIG. 8.

FIGS. 8 and 9 illustrate an example of a battery cell manufactured by the method according to the embodiment of the present invention. As illustrated in FIGS. 8 and 9, a battery cell 400 manufactured by the method according to the embodiment of the present invention may have an electrode assembly formed in various manners and mounted within a battery case, and may be manufactured to have a shape corresponding to that of the electrode assembly, thereby advantageously allowing for the implementation of various types of design.

Meanwhile, the battery cell may be a lithium ion battery or a lithium ion polymer battery, but the present invention is not limited thereto.

The battery cell according to the embodiment of the present invention described above may be used solely, or in the form of a battery pack including at least one battery cell. The battery cell and/or the battery pack according to the present invention may be usefully used in various devices, for example, mobile phones, portable computers, smartphones, smartpads, netbooks, light electronic vehicles (LEVs), electric vehicles, hybrid electric vehicles, plug-in hybrid electric vehicles, power storage devices and the like. Since structures and manufacturing methods of these devices are commonly known in the art, detailed descriptions thereof will be omitted.

When the battery cell or the battery pack according to the present invention is mounted in the above-described devices, system parts of the devices may be positioned in an extra space formed due to the structure of the battery cell or the battery pack according to the present invention. Since the battery cell or the battery pack according to the present invention may be formed in various manners and for example, may be formed to include a single curved corner portion, when the battery cell or the battery pack according to the present invention is mounted in a device, an extra space which has not existed in the related art battery cell or battery pack is generated. Thus, when system parts for the device are equipped in the extra space, the system parts and the battery cell or the battery pack may be smoothly disposed, so that space availability may be improved and an overall thickness or volume of the device is decreased to realize a slim design.

What is claimed is:

1. A method of manufacturing an electrode assembly, the method comprising:
   preparing an electrode laminate including at least one negative electrode, at least one positive electrode, and at least one separation film;
   generating a separation film assembly by bonding remaining portions of the separation film positioned in regions not corresponding to shapes of the negative electrode and the positive electrode; and
   cutting the separation film assembly inwardly of a bonding line generated due to the bonding so as to correspond to the shapes of the negative electrode and the positive electrode.

2. The method of claim 1, wherein the electrode laminate includes the at least one negative electrode, the at least one positive electrode, and a plurality of first separation films interposed between the negative electrode and the positive electrode, and
   the first separation films have shapes different from those of the negative electrode and the positive electrode.

3. The method of claim 1, wherein the electrode laminate includes:
   a plurality of unit cells respectively including the at least one negative electrode, the at least one positive electrode, and at least one first separation film interposed between the negative electrode and the positive electrode; and
   at least one second separation film disposed on an interface between the unit cells, and
   at least one of the first separation film and the second separation film has a shape different from those of the negative electrode and the positive electrode.

4. The method of claim 1, wherein the electrode laminate includes:
- a plurality of unit cells respectively including the at least one negative electrode, the at least one positive electrode, and at least one first separation film interposed between the negative electrode and the positive electrode; and
- a long sheet-type second separation film covering the unit cells, and
- at least one of the first separation film and the second separation film has a shape different from those of the negative electrode and the positive electrode.

5. The method of claim 1, wherein the electrode laminate includes the at least one negative electrode, the at least one positive electrode, and a long sheet-type first separation film covering the negative electrode and the positive electrode.

6. The method of claim 1, wherein the generating of the separation film assembly is performed by fusing the remaining portions of the separation film.

7. The method of claim 1, wherein the generating of the separation film assembly is performed at a temperature of $(Tg-20)°$ C. to $(Tg+20)°$ C., where Tg is a glass transition temperature of the separation film, defined by the inherent temperature at which a polymer material of the separation film changes from a rubbery state to a glassy state.

8. The method of claim 1, wherein the cutting of the separation film assembly is performed using a cutting blade, a die, scissors, or a laser beam.

* * * * *